United States Patent
Song et al.

(10) Patent No.: US 8,909,167 B2
(45) Date of Patent: Dec. 9, 2014

(54) WIRELESS COMMUNICATION DEVICE FOR SWITCHING ANTENNAS

(75) Inventors: Al-Ning Song, Shanghai (CN); Guo-Hui Peng, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 137 days.

(21) Appl. No.: 13/532,805

(22) Filed: Jun. 26, 2012

(65) Prior Publication Data
US 2013/0130631 A1     May 23, 2013

(30) Foreign Application Priority Data
Nov. 21, 2011   (CN) .......................... 2011 1 0371149

(51) Int. Cl.
*H04B 1/44*   (2006.01)
*H04B 1/48*   (2006.01)

(52) U.S. Cl.
CPC ....................................... *H04B 1/48* (2013.01)
USPC .............. 455/78; 455/73; 455/83; 455/562.1; 455/134; 455/191.3

(58) Field of Classification Search
CPC ......... H04B 1/40; H04B 1/44; H04B 2001/44
USPC ........... 455/39, 73, 78, 83, 550.1, 562.1, 134, 455/191.3, 272
See application file for complete search history.

(56) References Cited

U.S. PATENT DOCUMENTS

2005/0090287 A1      4/2005  Rofougaran
2010/0311339 A1*  12/2010  Chung et al. ................. 455/41.3

FOREIGN PATENT DOCUMENTS

CN           101908903 A          12/2010

* cited by examiner

*Primary Examiner* — Tuan Pham
(74) *Attorney, Agent, or Firm* — Novak Druce Connolly Bove + Quigg LLP

(57) ABSTRACT

A wireless communication device comprises a first antenna, a second antenna, a switch, and a balun. The first antenna and the second antenna transmit and receive signals. The wireless communication device can use only one antenna (the first antenna) or the two antennas (the first antenna and the second antenna) at the same time according to a comparison between received signal strength indications (RSSIs) of the antennas and a maximum input level of the wireless communication device.

11 Claims, 3 Drawing Sheets

WIRELESS COMMUNICATION DEVICE FOR SWITCHING ANTENNAS

BACKGROUND

1. Technical Field

Embodiments of the present disclosure generally relate to wireless communications, and more particularly to a wireless communication device for switching antennas.

2. Description of Related Art

FIG. 3 shows a typical wireless communication device 200. The device 200 comprises a first antenna 10a, a second antenna 20a, a single pole double throw (SPDT) switch 30a, a transceiving module 50a, and a baseband module 60a. When the device 200 starts to receive signals, the device 200 switches to the first antenna 10a, where the baseband module 60a transmits a control signal to the SPDT switch 30a to connect the first antenna 10a and the transceiving module 50a. If the quality of a signal received by the first antenna 10a is poor, the device 200 switches to the second antenna 20a, where the baseband module 60a transmits a control signal to the SPDT switch 30a to connect the second antenna 10a and the transceiving module 50a.

However, there is no guarantee that the quality of the signal received by the second antenna 20a is better than the quality of the signal received by the first antenna 10a. It means that the quality of the signal received by the second antenna 20a maybe worse than the quality of the signal received by the first antenna 10a, so the device 200 needs to switch to the first antenna 10a once again.

As mentioned hereinabove, the device 200 may switch back and forth between the first antenna 10a and the second antenna 20a continually, which is inconvenient and inefficient.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

Figure 1:
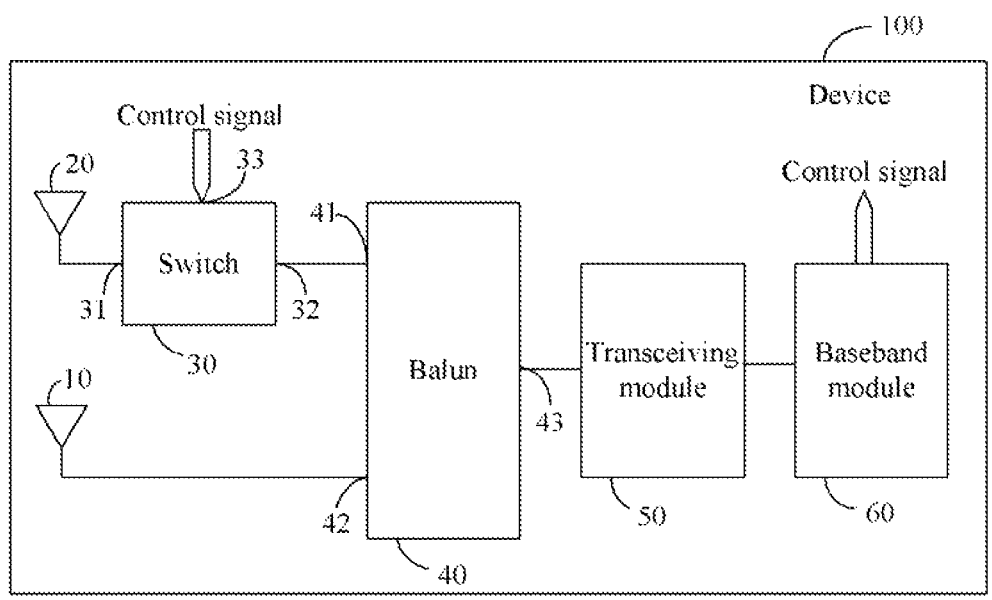
FIG. 1 is a schematic diagram of one embodiment of a wireless communication device in accordance with the present disclosure.

FIG. 1 is a schematic diagram of one embodiment of a wireless communication device in accordance with the present disclosure. In one embodiment, the wireless communication device may be a tablet computer, a mobile communication device, and a smart phone, for example. In one embodiment, the wireless communication device is referred to as device 100, and the device 100 may comprise a first antenna 10, a second antenna 20, a switch 30, a balun 40, a transceiving module 50, and a baseband module 60. The first antenna 10 transmits and receives first signals, and the second antenna 20 transmits and receives second signals. In one embodiment, the frequencies of the first signals are the same as the frequencies of the second signals, and the first signals and the second signals are radio signals.

The switch 30 comprises a first connection terminal 31, a second connection terminal 32, and a control terminal 33. The first connection terminal 31 is connected to the second antenna 20, the second connection terminal 32 is connected to the balun 40, and the control terminal 33 receives a control signal from the baseband module 60. The switch 30 connects the first connection terminal 31 to the second connection terminal 32 or disconnects the first connection terminal 31 from the second connection terminal 32 according to the control signal received from the baseband module 60.

The balun 40 comprises a first balanced terminal 41, a second balanced terminal 42, and an unbalanced terminal 43. The first balanced terminal 41 is a port used to transmit and receive the second signals, and the second balanced terminal 42 is a port used to transmit and receive the first signals, and the unbalanced terminal 43 is a port used to transmit and receive radio signals. The first balanced terminal 41 is connected to the second connection terminal 32 of the switch 30, the second balanced terminal 42 is connected to the first antenna 10, and the unbalanced terminal 43 is connected to the transceiving module 50.

The transceiving module 50 is connected between the unbalanced terminal 43 of the balun 40 and the baseband module 60. The baseband module 60 is connected to the transceiving module 50 and transmits the control signal to the control terminal 33 of the switch 30 to trigger a connection or a disconnection of the first connection terminal 31 and the second connection terminal 32 through the switch 30.

In the first embodiment of the present disclosure, when the first antenna 10 receives the first signals, and the second antenna 20 receives the second signals, and the baseband module 60 controls the switch 30 to connect the first connection terminal 31 to the second connection terminal 32, the balun 40 converts the first signals from the first antenna 10 and the second signals from the second antenna 20 into one-way signals which are the integration of the first signals and the second signals, and the balun 40 transmits the one-way signals to the transceiving module 50, the transceiving module 50 down converts the one-way signals and transmits the down converted one-way signals to the baseband module 60, and the baseband module 60 demodulates the down converted one-way signals.

In the second embodiment of the present disclosure, when the first antenna 10 transmits the first signals and the second antenna 20 transmits the second signals, and the baseband module 60 controls the switch 30 to connect the first connection terminal 31 to the second connection terminal 32, the baseband module 60 modulates signals transmitted by the first antenna 10 and the second antenna 20, and the baseband module 60 transmits the modulated signals to the transceiving module 50, the transceiving module 50 up converts the modulated signals and transmits the up converted modulated signals to the balun 40, the balun 40 converts the up converted modulated signals into the two-way signals that comprise the first signals and the second signals, and the balun 40 respectively transmits the first signals and the second signals to the first antenna 10 and the second antenna 20, and the first antenna 10 and the second antenna 20 transmit the first signals and the second signals, respectively.

In the third embodiment of the present disclosure, when the first antenna 10 receives the first signals, and the baseband module 60 controls the switch to disconnect the first connection terminal 31 from the second connection terminal 32, the balun 40 transmits the first signals from the first antenna to the transceiving module 50, the transceiving module 50 down converts the first signals and transmits the down converted first signals to the baseband module 60, and the baseband module 60 demodulates the down converted first signals.

In the fourth embodiment of the present disclosure, when the first antenna 10 transmits the first signals and the baseband module 60 controls the switch 30 to disconnect the first connection terminal 31 from the second connection terminal 32, the baseband module 60 modulates signals transmitted by the first antenna 10 and the second antenna 20, and the baseband module 60 transmits the modulated signals to the transceiving module 50, the transceiving module 50 up converts the modulated signals and transmits the up converted modulated signals to the balun 40, the balun 40 transmits the up converted modulated signals to the first antenna 10, and the first antenna transmits 10 the up converted modulated signals.

In one embodiment, the wireless communication device comprises a plurality of antennas, the balun 40 connected to part of the plurality of antennas, the switch 30 connected between the remaining antenna(s) and the balun 40, the transceiving module 50 connected to the balun 40, and the baseband module 60 connected to the transceiving module 50. The baseband module 60 controls the switch 30 to trigger connection between the remaining antenna(s) and the balun 40, and the balun 40 converts multi-way signals from the plurality of antennas to one-way signals and transmits the one-way signals to the transceiving module 50, and further converts one-way signals from the transceiving module 50 to multi-way signals and transmit the multi-way signals to the plurality of antennas. In the present embodiment, the part of the plurality of antennas may be the first antenna 10, the remaining antenna may be the second antenna 20.

According to communication theory of the antenna and referring to the wireless communication device shown in FIG. 1, when a phase difference between the first signals from the first antenna 10 and the second signals from the second antenna 20 is between 90 and 180 degrees, the strength of the first signals and the second signals increases upon the condition that the first antenna 10 receives the first signals and the second antenna 20 receives the second signals at the same time, the baseband module 60 controls the switch 30 to connect the first connection terminal 31 and the second connection terminal 32. When the phase difference between the first signals from the first antenna 10 and the second signals from the second antenna 20 is between 0 and 90 degrees, the strength of the first signals and the second signals decreases, and even the first signals offset the second signals upon the condition that the first antenna 10 receives the first signals and the second antenna 20 receives the second signals at the same time, the baseband module 60 controls the switch 30 to disconnect the first connection terminal 31 and the second connection terminal 32, and only the first antenna 10 receives the first signals and the second antenna 20 do not receive the second signals.

In the present embodiment, a maximum input level of the wireless communication device is defined according to a wireless communication protocol utilized by the wireless communication device and working frequency of the wireless communication device. For example, if the wireless communication protocol utilizes IEEE 802.11b and the working frequency of the wireless communication is 1 MHz (mega Hertz) or 2 MHz, the maximum input level of the wireless communication device is −4 dBm (decibels above one milliwatt in 600 ohms); if the wireless communication protocol utilizes IEEE 802.11b and the working frequency of the wireless communication is 5.5 MHz or 11 MHz, the maximum input level of the wireless communication device is −10 dBm; if the wireless communication protocol utilizes IEEE 802.11b and the working frequency of the wireless communication is 2.4 GHz (gigahertz), the maximum input level of the wireless communication device is −30 dBm.

Referring to the communication theory of the antenna, the baseband module 60 controls the switch 30 to connect the first connection terminal 31 to the second connection terminal 32 according to the phase difference between the first signals from the first antenna 10 and the second signals from the second antenna 20. However, in practice, it is difficult for the baseband module 60 to calculate the phase difference between the first signals from the first antenna 10 and the second signals from the second antenna 20, but it is easily for the baseband module 60 to calculate a received signal strength indication (RSSI) of the first antenna 10 and the second antenna 20. Furthermore, the baseband module 60 can calculate the phase difference between the first signals from the first antenna 10 and the second signals from the second antenna 20 according to a result of comparison between the RSSI of the first antenna 10 and the second antenna 20 and the maximum input level of the wireless communication device. As mentioned hereinabove, in the present embodiment, the baseband module 60 can transmit the control signal to the control terminal 33 of the switch 30 to trigger connection or disconnection of the first connection terminal 31 and the second connection terminal 32 according to the result of comparison between the RSSI of the first antenna 10 and the second antenna 20 and the maximum input level of the wireless communication device.

In the present embodiment, for example, when the first antenna 10 receives the first signals and the second antenna 20 do not receive the second signals, the RSSI of the first antenna 10 is referred to as RSSI-Ant1, and when the first antenna 10 receives the first signals and the second antenna 20 receives the second signals at the same time, the RSSI of the first antenna 10 and the second antenna 20 is together referred to as RSSI-Ant1&Ant2. The maximum input level of the wireless communication device is referred to as MIL. If RSSI-Ant1&Ant2>RSSI-Ant1>MIL, the phase difference between the first signals from the first antenna 10 and the second signals from the second antenna 20 may be between 0 F and 90 degree, the baseband module 60 controls the switch 30 to disconnect the first connection terminal 31 from the second connection terminal 32, and only the first antenna 10 transmits and receives the first signals and the second antenna 20 does not transmit and receive the second signals.

If RSSI-Ant1&Ant2>MIL>RSSI-Ant1, the phase difference between the first signals from the first antenna 10 and the second signals from the second antenna 20 may be between 0 and 90 degrees, the baseband module 60 controls the switch 30 to disconnect the first connection terminal 31 from the second connection terminal 32, and only the first antenna 10 transmits and receives the first signals and the second antenna 20 do not transmits or receives the second signals.

If MIL>RSSI-Ant1&Ant2>RSSI-Ant1, the phase difference between the first signals from the first antenna 10 and the second signals from the second antenna 20 may be between 90 and 180 degrees, the baseband module 60 controls the switch 30 to connect the first connection terminal 31 to the second connection terminal 32, and the first antenna 10 transmits and receives the first signals and the second antenna 20 transmits and receives the second signals at the same time.

In the present embodiment, for example, if the wireless communication device utilizes IEEE 802.11b and the working frequency of the wireless communication device is 1 MHz, MIL is −4 dBm, RSSI-Ant1 is −53 dBm, and RSSI-Ant1&Ant2 is −50 dBm. It indicates that MIL>RSSI-Ant1&Ant2>RSSI-Ant1, the baseband module 60 controls the switch 30 to connect the first connection terminal 31 to the second connection terminal 32, and the first antenna 10 transmits and receives the first signals and the second antenna 20 transmits and receives the second signals at the same time.

The present disclosure is not limited to controlling the connection or disconnection of the first connection terminal 31 and the second connection terminal 32 of the switch 30 according to the result of comparison between the RSSI of the first antenna 10 and the second antenna 20 and the maximum input level of the wireless communication device. In the other embodiment with changes or modifications, the baseband module 60 can calculate the phase difference between the first antenna 10 and the second antenna 20 according to the other parameters, and then controls the connection or disconnection of the first connection terminal 31 and the second connection terminal 32 of the switch 30. Furthermore, in practice, the distance between the first antenna 10 and the second antenna 20 is larger than a half wavelength of signals transmitted and received by the first antenna 10 and the second antenna 20. As a result, the phase difference between the first signals from the first antenna 10 and the second signals from the second antenna 20 is closer to 180 degrees.

In one embodiment, the wireless communication device comprising a plurality of antennas, the balun 40 connected to part of the plurality of antennas, the switch 30 connected between the remaining antenna(s) and the balun 40, the transceiving module 50 connected to the balun 40, and the baseband module 60 connected to the transceiving module 50, wherein the baseband module 60 controls the switch 30 to trigger connection between the remaining antenna(s) and the balun 40 according to a phase difference between first signals from the part of the plurality antennas and second signals from the remaining antenna(s). Furthermore, the baseband module 60 could control the switch 30 according to a comparison between RSSIs of the plurality of antennas and the maximum input level of the wireless communication device. In the present embodiment, the part of the plurality of antennas may be the first antenna 10, the remaining antenna(s) may be the second antenna 20.

In the existing technology, an unbalance terminal of a balun is always connected to an antenna side, and the other two balance terminals of the balun are always connected to a transceiving module side. By contrast, the present disclosure makes the first balance terminal 41 and the second balance terminal 42 connected to the first antenna 10 and the second antenna 20 side, and the unbalance terminal 43 connected to the transceiving module 50 side. So the balun 40 can convert two-way signals comprising the first signals received from the first antenna 10 and the second signals received from the second antenna 20 respectively into one-way signals, and increase strength of the one-way signals when the phase difference between the first signals from the first antenna 10 and the second signals from the second antenna 20 is closer to 180 degrees. The present disclosure can avoid changing antennas continually. Furthermore, there is at least one antenna working in the wireless communication device, and the wireless communication device can use only one antenna or use the two antennas at the same time.

Figure 2:
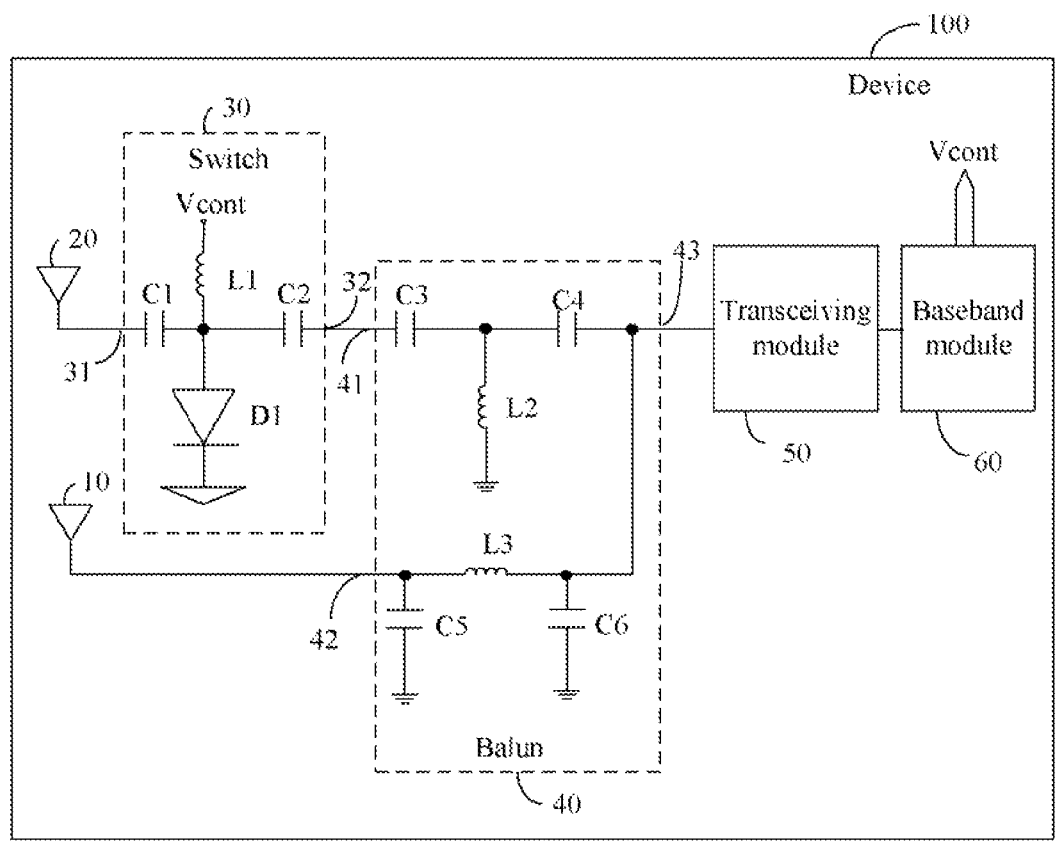
FIG. 2 is a circuit diagram of the switch and the balun of the wireless communication device in FIG. 1.
Figure 3:
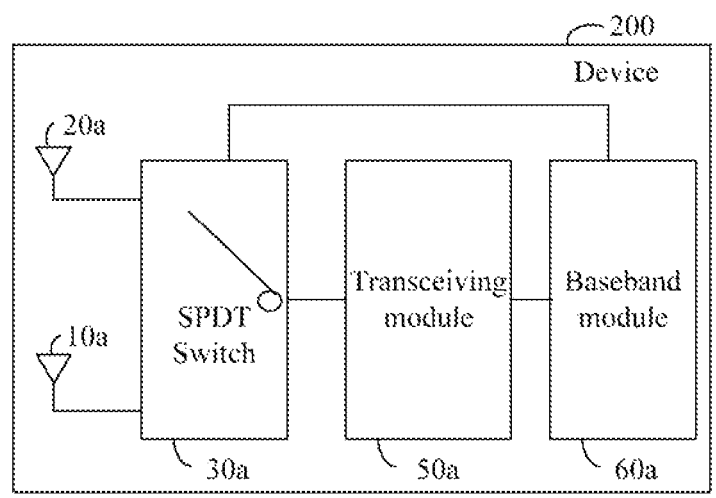
FIG. 3 is a schematic diagram of a typical wireless communication device.

FIG. 2 is a circuit diagram of the switch and the balun of the wireless communication device. The switch 30 and the balun 40 are not to be construed as being limited thereto. Various changes or modifications may be made to the switch 30 and the balun 40 without departing from the scope and spirit of the present disclosure.

In the present embodiment, the switch 30 is a PIN diode switch. The switch 30 comprises a first capacitor C1, a second capacitor C2, a first inductor L1 and a diode D1. The first capacitor C1 comprises a first terminal and a second terminal, wherein the first terminal of the first capacitor C1 is connected to the first antenna 10 and acts as the first connection terminal 31 of the switch 30. The second capacitor C2 comprises a first terminal and a second terminal, wherein the first terminal of the second capacitor C2 is connected to the second terminal of the first capacitor C1, the second terminal of the second capacitor C2 is connected to the balun 40 and acts as the second connection terminal 32 of the switch 30. The first inductor L1 comprises a first terminal and a second terminal, wherein the first terminal of the first inductor is connected to a common node of the first capacitor C1 and the second capacitor C2, the second terminal of the first inductor L1 receives the control signal Vcont and acts as the control terminal 33 of the switch 30. The diode D1 comprises a cathode connected to a ground and an anode connected to a common node of the first capacitor C1, the second capacitor C2 and the first inductor L1. When the control signal Vcont is a high voltage level signal that is operable to trigger a diode to turn on, the diode D1 turns on and is connected to the ground, and the switch 30 disconnects the first connection terminal 31 from the second connection terminal 32; when the control signal Vcont is a low voltage level signal that is operable to trigger a diode to turn off, the diode D1 turns off, and the switch 30 connects the first connection terminal 31 and the second connection terminal 32. In one example, the voltage of the high voltage level signal is higher than 3 voltage, and the voltage of the low voltage level signal is lower than 0.6 voltage.

In the present embodiment, the first inductor L1 is used to block high frequency signals, so as to control trigger of the switch 30. The first capacitor C1 and the second capacitor C2 are used to block direct current signals and transmit radio frequency signals. When the phase of the first signals from the first antenna 10 is same as the phase of the second signals from the second antenna 20, and the strength of the first signal is near to the strength of the second signal, the present disclosure can avoid that the first signal offsets the second signal.

In the present embodiment, the balun 40 comprises a third capacitor C3, a fourth capacitor C4, a second inductor L2, a fifth capacitor C5, a sixth capacitor C6, a third inductor L3. The third capacitor C3 comprises a first terminal and a second terminal, wherein the first terminal of the third capacitor C3 acts as the first balance terminal 41 connected to the second connection terminal 32 of the switch 30. The fourth capacitor C4 comprises a first terminal and a second terminal, wherein the first terminal of the fourth capacitor C4 is connected to the second terminal of the third capacitor C3. The second inductor L2 comprising a first terminal and a second terminal, wherein the first terminal of the second inductor L2 is connected to a common node of the third capacitor C3 and the fourth capacitor C4, the second terminal of the second inductor L2 is connected to a ground. The fifth capacitor C5 comprising a first terminal and a second terminal, wherein the first terminal of the fifth capacitor C5 acts as the second balance terminal 42 connected to the first antenna 10. The third inductor L3 comprising a first terminal and a second terminal, wherein the first terminal of the third inductor L3 is connected to a common node of the first antenna 10 and the fifth capacitor C5, the second terminal of the third inductor is connected to the second terminal of the fourth capacitor C4. The sixth capacitor C6 comprises a first terminal and a second terminal, wherein the first terminal of the sixth capacitor C6 is connected to a common node of the third inductor L3 and the fourth capacitor C4, the second terminal of the sixth capacitor C6 is connected to the ground, a common node of the third inductor L3, the sixth capacitor C6 and the fourth capacitor C4 is the unbalance connection terminal 40 connected to the transceiving module 50.

In the present embodiment, the phases of the second signals from the second antenna 20 can move 90 degrees forward by using a combination of the third capacitor C3, the fourth capacitor C4 and the second inductor L2, and the phases of the first signals received from the first antenna 10 can move 90 degrees forward by using a combination of the fifth capacitor C5, the sixth capacitor C6 and the third inductor L3. As a result, the balun 40 can convert the first signals from the first antenna 10 and the second signals from the second antenna 20 into one-way signals easily, and the strength of the one-way signals can increase.

The wireless communication device can use only one antenna (the first antenna 10) or the two antennas (the first antenna 10 and the second antenna 20) at the same time through the switch 30 and the balun 40. The present disclosure can avoid the disadvantageous of changing/switching antenna continually.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A wireless communication device, comprising:
a first antenna operable to transmit and receive first signals;
a second antenna operable to transmit and receive second signals;
a switch comprising a first connection terminal connected to the second antenna, a second connection terminal, and a control terminal for receiving a control signal, wherein the switch connects the first connection terminal to the second connection terminal or disconnects the first connection terminal from the second connection terminal according to the control signal;
a balun comprising a first balance terminal connected to the second connection terminal of the switch, a second balance terminal connected to the first antenna, and an unbalance terminal;
a transceiving module connected to the unbalance terminal of the balun; and
a baseband module connected to the transceiving module and operable to transmit the control signal to the control terminal of the switch to trigger connection or disconnection of the first connection terminal and the second connection terminal through the switch in response to the control signal;
wherein the switch further comprises:
a first capacitor comprising a first terminal and a second terminal, wherein the first terminal of the first capacitor is connected to the second antenna and acts as the first connection terminal of the switch;
a second capacitor comprising a first terminal and a second terminal, wherein the first terminal of the second capacitor is connected to the second terminal of the first capacitor, the second terminal of the second capacitor is connected to the balun and acts as the second connection terminal of the switch;
a first comprising a first terminal and a second terminal, wherein the first terminal of the first inductor is connected to a common node of the first capacitor and the second capacitor, the second terminal of the first inductor is operable to receive the control signal and acts as the control terminal of the switch; and
a diode comprising a cathode connected to a ground and an anode connected to a common node of the first capacitor, the second capacitor and the first inductor;
wherein when the control signal is a high voltage level signal, the diode turns on and is connected to the ground, and the switch disconnects the first connection terminal from the second connection terminal;
wherein when the control signal is a low voltage level signal, the diode turns off, and the switch connects the first connection terminal and the second connection terminal.

2. The wireless communication device as claimed in claim 1, wherein when the first antenna receives the first signals, the second antenna receives the second signals, and the baseband module controls the switch to connect the first connection terminal to the second connection terminal, the balun converts the first signals from the first antenna and the second signals from the second antenna into one-way signals, and transmits the one-way signals to the transceiving module, the transceiving module down converts the one-way signals and transmits the down converted one-way signals to the baseband module, and the baseband module demodulates the down converted one-way signals.

3. The wireless communication device as claimed in claim 2, wherein when the first antenna transmits the first signals and the second antenna transmits the second signals, and the baseband module controls the switch to connect the first connection terminal to the second connection terminal, the baseband module modulates signals transmitted by the first antenna and the second antenna, and the baseband module transmits the modulated signals to the transceiving module, the transceiving module up converts the modulated signals and transmits the up converted modulated signals to the balun, the balun converts the up converted modulated signals into two-way signals that comprise the first signals and the second signals and respectively transmits the first signals and the second signals to the first antenna and the second antenna, and the first antenna and the second antenna transmit the first signals and the second signals, respectively.

4. The wireless communication device as claimed in claim 3, wherein when the first antenna receives the first signals, and the baseband module controls the switch to disconnect the first connection terminal from the second connection terminal, the balun transmits the first signals from the first antenna to the transceiving module, the transceiving module down converts the first signals and transmits the down converted first signals to the baseband module, and the baseband module demodulates the down converted first signals.

5. The wireless communication device as claimed in claim 4, wherein when the first antenna transmits the first signals and the baseband module controls the switch to disconnect the first connection terminal from the second connection terminal, the baseband module modulates signals transmitted by the first antenna and transmits the modulated signals to the transceiving module, the transceiving module up converts the modulated signals and transmits the up converted modulated signals to the balun, the balun transmits the up converted modulated signals to the first antenna, and the first antenna transmits the up converted modulated signals.

6. The wireless communication device as claimed in claim 1, wherein the balun comprises:
a third capacitor comprising a first terminal and a second terminal, wherein the first terminal of the third capacitor acts as the first balance terminal connected to the second connection terminal of the switch;

a fourth capacitor comprising a first terminal and a second terminal, wherein the first terminal of the fourth capacitor is connected to the second terminal of the third capacitor;

a second inductor comprising a first terminal and a second terminal, wherein the first terminal of the second inductor is connected to a common node of the third capacitor and the fourth capacitor, and the second terminal of the second inductor is connected to a ground;

a fifth capacitor comprising a first terminal and a second terminal, wherein the first terminal of the fifth capacitor acts as the second balance terminal connected to the first antenna;

a third inductor comprising a first terminal and a second terminal, wherein the first terminal of the third inductor is connected to a common node of the first antenna and the fifth capacitor, the second terminal of the third inductor is connected to the second terminal of the fourth capacitor; and a sixth capacitor comprising a first terminal and a second terminal, wherein the first terminal of the sixth capacitor is connected to a common node of the third inductor and the fourth capacitor, the second terminal of the sixth capacitor is connected to the ground, and a common node of the third inductor, the sixth capacitor and the fourth capacitor is the unbalance connection terminal connected to the transceiving module.

7. The wireless communication device as claimed in claim 1, wherein the baseband module controls the switch according to a phase difference between the first antenna and the second antenna.

8. The wireless communication device as claimed in claim 7, wherein the baseband module controls the switch to connect the first connection terminal to the second connection terminal upon a condition that the phase difference between the first signals from the first antenna and the second signals from the second antenna is between 90 and 180 degrees, and controls the switch to disconnect the first connection terminal from the second connection terminal upon the condition that the phase difference between the first signals from the first antenna and the second signals from the second antenna is between 0 and 90 degrees.

9. The wireless communication device as claimed in claim 8, wherein the baseband module controls the switch upon a comparison between received signal strength indications (RSSIs) of the first antenna and the second antenna and a maximum input level of the wireless communication device.

10. A wireless communication device, comprising:
a first antenna operable to transmit and receive first signals;
a second antenna operable to transmit and receive second signals;
a switch comprising a first connection terminal connected to the second antenna, a second connection terminal, and a control terminal for receiving a control signal, wherein the switch connects the first connection terminal to the second connection terminal or disconnects the first connection terminal from the second connection terminal according to the control signal;
a balun comprising a first balance terminal connected to the second connection terminal of the switch, a second balance terminal connected to the first antenna, and an unbalance terminal;
a transceiving module connected to the unbalance terminal of the balun; and
a baseband module connected to the transceiving module and operable to transmit the control signal to the control terminal of the switch to trigger connection or disconnection of the first connection terminal and the second connection terminal through the switch in response to the control signal;
wherein the baseband module controls the switch to connect the first connection terminal to the second connection terminal upon a condition that a phase difference between the first signals from the first antenna and the second signals from the second antenna is between 90 and 180 degrees, and controls the switch to disconnect the first connection terminal from the second connection terminal upon the condition that the phase difference between the first signals from the first antenna and the second signals from the second antenna is between 0 and 90 degrees.

11. A wireless communication device, comprising:
a first antenna operable to transmit and receive first signals;
a second antenna operable to transmit and receive second signals;
a switch comprising a first connection terminal connected to the second antenna, a second connection terminal, and a control terminal for receiving a control signal, wherein the switch connects the first connection terminal to the second connection terminal or disconnects the first connection terminal from the second connection terminal according to the control signal;
a balun comprising a first balance terminal connected to the second connection terminal of the switch, a second balance terminal connected to the first antenna, and an unbalance terminal;
a transceiving module connected to the unbalance terminal of the balun; and
a baseband module connected to the transceiving module and operable to transmit the control signal to the control terminal of the switch to trigger connection or disconnection of the first connection terminal and the second connection terminal through the switch in response to the control signal;
wherein the baseband module controls the switch upon a comparison between received signal strength indications (RSSIs) of the first antenna and the second antenna and a maximum input level of the wireless communication device.

* * * * *